3,826,674
HYDROPHILIC FOAM
E. C. A. Schwarz, Neenah, Wis., assignor to
Kimberly-Clark Corporation, Neenah, Wis.
No Drawing. Continuation-in-part of abandoned application Ser. No. 19,102, Mar. 12, 1970. This application Apr. 28, 1972, Ser. No. 248,491
Int. Cl. B44d 5/12; C08g 22/44
U.S. Cl. 117—62.2                                  9 Claims

ABSTRACT OF THE DISCLOSURE

Polyurethane foams are rendered hydrophilic by coating an anhydride containing polymer onto the foam and thereafter reacting at least a portion of the anhydride groups with ammonia or a primary or secondary amine. The permanence of the foam's hydrophilic character can be enhanced by crosslinking the anhydride coated foam with a polyfunctional amine.

RELATED APPLICATIONS

This is a continuation-in-part of my earlier filed and now abandoned, Ser. No. 19,102, filed Mar. 12, 1970, entitled Hydrophilic Foam.

DESCRIPTION OF THE INVENTION

This invention relates to polyurethane foams and more particularly to polyurethane foams which are hydrophilic.

The potential of using polyurethane foams as a substitute for conventional absorbent wipes and toweling has long been recognized. Being substantially porous in nature, such foams have a potentially large capacity for holding fluids. Additionally, the foams are inexpensive to manufacture and exhibit very desirable strength properties.

However, in actual fact, polyurethane foams have not found substantial use in absorbent wipe and toweling applications. The reason for this is that polyurethane is an inherently hydrophobic material. Thus, to be useful in such applications it must be made hydrophilic. While ferrous methods have been suggested for preparing hydrophilic polyurethane foams, such as modifying the basic polyurethane polymer during preparation or subsequently treating the prepared polyurethane foam, none of the known techniques have been widely accepted. In general, such techniques have been either too expensive for practical purposes or are simply ineffective in imparting an adequate hydrophilic character to the foam.

Accordingly, it is an object of the present invention to provide a polyurethane foam with an improved hydrophilic character.

It is a further object to provide such a foam wherein the hydrophilic character remains even after repeated usage. It is a still further object to provide a foam such as described above which can be simply and economically prepared.

Other objects and advantages of the present invention will become apparent as the following description proceeds.

While the present invention is susceptible of various modifications and alternative constructions, there will be herein described in detail the preferred embodiments. It is to be understood, however, that it is not intended to limit the invention to the specific forms disclosed. On the contrary, it is intended to cover all modifications and all alternative constructions falling within the spirit and scope of the invention as expressed in the appended claims.

Briefly, the process herein illustrated involves applying an organic solvent solution of an anhydride containing polymer to a conventional open cell polyurethane foam such that the solution substantially thoroughly impregnates the foam, heating the foam to remove the solvent and leave a coating of the polymer on the foam and, thereafter, reacting the polymer with ammonia or a low molecular weight primary or secondary amine. The resulting polyurethane foam exhibits a surprisingly high hydrophilic character. Moreover, by having a cross-linking agent such as a polyfunctional amine present during the ammonia or amine reaction, the hydrophilic character of the foam can be preserved even after repeated use.

A variety of well known techniques are available for preparing polyurethane foams useful herein. In general, such foams are prepared by reacting a polyisocyanate with a polyol in the presence of a suitable catalyst and a blowing agent. The most common polyurethane foam is that prepared by reacting toluene diisocyanate with polyethylene or polypropylene glycol in a molar ratio or about 1 to 1 using a tertiary amine catalyst such as N-ethyl morpholine or dimethyl benzylamine. Water or a fluorinated hydrocarbon are customarily used as blowing agents. Reference is made to U.S. Pat. 3,308,081 issued on June 11, 1968 to Merten and Braun for a comprehensive description of the preparation of polyurethane foams useful herein. Particular attention is directed to that portion of the patent starting in column 3 at line 16, and continuing through column 5, line 32.

Polymers useful herein for coating onto the polyurethane form are addition polymers containing pendant anhydride groups of carboxylic acid and can be selected from a variety of customarily available polymers. In selecting an appropriate polymer, sufficient anhydride groups must be present to react with the primary or secondary amine and, when extensive durability is desired, provide sufficient reactive sites for a cross-linking reaction. Polymers prepared by reacting maleic anhydride in at least about a one to three molar ratio with a comonomer are particularly useful, though polymers containing as little as about 10 mole percent maleic anhydride content can be employed. Examples of useful anhydride polymers include maleic anhydride-styrene copolymers wherein the mole ratio of anhydride to styrene varies from 1:1 to 1:4, maleic anhydride-vinyl acetate copolymers with similar ratios and polyacrylic anhydride. Other useful polymers are the copolymers of maleic anhydride with, among others, one or more of the following monomers: olefins such as ethylene, propylene, butadiene, etc. and vinyls such as the alkyl (e.g., methyl, ethyl) vinyl ethers. The anhydride polymer is desirably coated onto the polyurethane foam in an amount such that, based on the weight of the foam, about 0.1%–2% of anhydride polymer is provided though higher quantities, e.g. up to about 5–10%, can also be used.

Coating of the anhydride polymer onto the polyurethane foam can conveniently be accomplished by applying the anhydride polymer to the foam as an organic solvent solution followed by heating to remove the solvent and leave the polymer coating. The solution should sufficiently permeate the foam so that the resultant polymer coating occupies substantially all of the foam's cellular surface area. Water solutions or dispersions are usually not useful since the anhydride groups hydrolyze. Accordingly, useful anhydride polymers should be soluble in a solvent which can be volatized at a temperature which is not detrimental to polyurethane foam. Also, while not particularly critical, it is desirable to use an anhydride polymer with a relatively high molecular weight. While, in order to obtain the hydrophilic benefits of the present invention, molecular weight is not especially important, durable coatings are best achieved with high molecular weight polymers. Polymers having a molecular weight (number average) of 1,000–50,000 have been found to be particularly useful.

As indicated above, coating of the anhydride polymer onto the polyurethane surface can be accomplished by applying the anhydride polymer to the surface in solution and then heating to remove the solvent. Heating the foam to a temperature of about 130° F. for about 1 minute is generally adequate to remove the solvent. Higher temperatures and longer times can, of course, be used so long as they do not detrimentally affect either the anhydride polymer or the polyurethane itself. The use of higher temperatures and times may, in fact, be employed with advantage since it is thought that some grafting of the polymer to the foam's surface and resultant enhanced permanence of the coating may occur. Similarly, a grafting catalyst which promotes opening of the anhydride ring can be used for this purpose. Tertiary amines are useful catalysts.

After the polymer coating is applied, the polyurethane foam is rendered hydrophilic by reacting the anhydride polymer with ammonia or a low molecular weight primary or secondary amine with monofunctionality. As used herein, the term "low molecular weight" refers to those amines which do not contain so many carbon to carbon linkages that they are hydrophobic in character. In addition, the use of low molecular weight amines permits the subsequent removal of excess amine by simple heating. In general, the useful amines should not have a molecular weight in excess of about 200, and preferably less than about 100. While the use of ammonia is preferred, amines such as dialkylamines (i.e., diethyl, dipropyl, dibutyl, etc.), morpholine, β-hydroxyethylamine, mono-N-alkyldiethylene diamine,

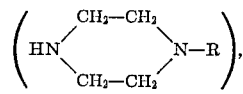

N-dialkyl-ethylene diamine,

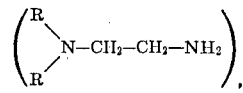

etc. can be used. Aromatics (e.g., aniline) can also be used but because of undesirable side effects (e.g., odor) they are generally avoided.

Reaction of the ammonia or the amine and the anhydride coated polyurethane foam is generally accomplished by applying ammonia or the amine to the foam as a solution, followed by heating to initiate the reaction and remove the solvent. Alternatively, particularly when ammonia is used, the foam can be exposed to the ammonia or amine vapor, thus eliminating the necessity of a solvent. When a solvent is used, suitable solvents include those such as acetone, methylene chloride, tetrahydrofuran, chloroform, etc. As is recognized in U.S. Pat. 2,313,565, the reaction of the anhydride and the ammonia or amine results in the formation of amide groups and carboxylic acid or salt groups unless long reaction times or a reaction medium containing a dehydrating agent such as an acid anhydride are employed. Since an excess of ammonia or amine is almost always used, the acid salt group of ammonia or the amine employed is as a practical matter present rather than the free acid group itself. The resulting coating after reaction can thus be characterized as an addition polymer containing pendant and adjacent amide and acid amide salt groups. Of course, the acid amide salt groups can be converted to the free acid groups by washing or driving off the excess ammonia or primary or secondary amine.

When the foam is to be used only once and thereafter disposed of, the foam prepared as above described is quite suitable. However, where the foam is to be repeatedly used, a degree of permanence with respect to its hydrophilic character is desirable. In accordance with a further preferred aspect of the present invention, a foam with a relatively permanent hydrophilic character can be prepared by reacting the polymeric anhydride containing coating with a cross-linking agent along with the ammonia or amine which reacts with anhydride groups.

Suitable cross-linking agents include polyfunctional amines, such as primary or secondary diamines and amines with higher functionality which are reactive with anhydride groups of the polymer coating. Examples of suitable cross-linking agents are diamines such as ethylenediamine, hexamethylene diamine, piperazine, m-phenylene diamine, etc., as well as other amines such as tetraethylene pentamine and the like, polyethylene imine, etc. However, since it is desirable that the hydrophilic foam not contain free amines, the use of highly functional cross-linking agents is ordinarily avoided due to the difficulty of removing any excess quantities used by conventional drying techniques.

The cross-linking reaction can be accomplished by known techniques, and results in a portion of the anhydride groups from different polymer molecules of the addition polymer reacting with the polyfunctional amine to form amide groups on each polymer molecule which bridge between the molecules. When the aforementioned ammonia or primary or secondary amine is added as a solution, the cross-linking agent can be directly included therein. The amount of cross-linking agent used depends on its reactivity with anhydride groups and the desired degree of crosslinking, the latter in turn depending on the anticipated extent to which the foam will be used. It should be noted that excessive cross-linking can be undesirable since cross-linking tends to prevent swelling when the foam is placed in water. Based on the moles of original anhydride groups present in the coated polymer, cross-linking to an extent of about 0.05–5 mole percent is suitable to obtain desirable hydrophilic permanence. The remaining anhydride groups are thus reacted with ammonia or the monofunctional primary or secondary amine.

The relative concentrations of cross-linking agent and ammonia or monofunctional primary or secondary amine employed in accomplishing the reactions discussed herein will of course depend on the respective volatiles of the ingredients and their reactivities with anhydride groups. For example, when the polyfunctional amine is highly reactive compared with ammonia or the monofunctional amine and/or when the monofunctional amine is quite volatile, substantially smaller concentrations of the cross-linking agent than the ammonia or monofunctional amine should be used. This assures that sufficient anhydride groups are available to react with ammonia or the monofunctional amine to achieve the desired hydrophilic effect.

The following examples illustrate the invention. All parts and percentages are by weight unless otherwise indicated.

Example I

A maleic anhydride/methyl vinyl ether copolymer (50 mole percent maleic anhydride, 3,000 m.w.) dissolved in acetone was padded on a 1/16" thick polyurethane foam sheet. The foam was prepared by reacting toluene diisocyanate with polypropylene glycol (M.W.=600). "Freon" was used as a blowing agent. The sheet was then heated to 130° F. for one minute after which it was immersed in an acetone bath containing 10% ammonium hydroxide and 0.1% ethylenediamine. Subsequently, the sheet was dried. The total weight increase of the foam sheet as a result of the above-described procedure was about 2%. The treated foam sample was able to absorb 20 times its weight of water, while the untreated sheet absorbed only 10 times its weight. Water also drained more rapidly from the untreated sample.

Example II

A maleic anhydride/styrene alternating copolymer (M.W.—2,000) was coated from a 5% solution in acetone on the polyurethane foam sheet prepared as in Example I. The sheet was heated to 130° F. for one minute to evaporate the solvent, and subsequently at 230° F. in an ammonia atmosphere for 10 minutes. The treated foam sample was able to absorb 18 times its weight of water.

Example III

This example illustrates the effect of cross-linking on durability:

A maleic anhydride/vinyl acetate alternating copolymer (M.W.=2,000) was coated from a 2% acetone solution on two polyurethane foam sheets, prepared as in Example I, to a dry pick-up level of 2.0%. Drying was accomplished in an oven at 130° F. for one minute. One of the samples (IIIa) was then immersed in a solution of 2% morpholine in acetone, the other (IIIb) in a 2% acetone solution of morpholine and hexamethylene diamine present in a weight ratio of 60 to 1. The foam samples were then dried at 200° F. for 5 minutes, and subjected to a normal home-laundry cycle using warm water, but not detergent. After air drying, the samples were tested for absorbency:

Sample IIIb was able to absorb and hold 16 times its weight of water, while sample IIIa only held 10 times its weight.

Example IV

A polyurethane foam sheet was coated with a maleic anhydride/styrene copolymer similar to that of Example II. The sheet was then immersed in a 5% solution of 2-aminoethanol in acetone. Excess solution was drained off and the foam sample was dried at 220° F. for 5 minutes. The unwashed sample so prepared had substantially identical absorbency behavior as sample IIIb.

I claim as my invention:

1. A process for rendering an open cell polyurethane foam hydrophilic comprising applying an organic solvent solution of an addition polymer containing pendant anhydride groups of a carboxylic acid to the surface of a polyurethane foam, heating the polyurethane foam to remove the solvent and leave a coating of the polymer on the foam's cellular surface area, and reacting the coated foam with ammonia or a low molecular weight primary or secondary monofunctional amine to impart the desired degree of hydrophilicity to the foam.

2. The process of claim 1 wherein the anhydride containing polymer is polyacrylic anhydride or a copolymer of maleic anhydride with styrene, vinyl acetate, ethylene, propylene, butadiene, methyl vinyl ether or ethyl vinyl ether.

3. The process of claim 2 wherein the low molecular weight primary or secondary amine is a dialkylamine, morpholine, β-hydroxyethylamine, mono-N-alkyldiethylene diamine, or N-dialkylethylene diamine.

4. The process of claim 3 wherein the addition polymer is cross-linked with a polyfunctional amine to provide permanence to the hydrophilic character.

5. A process for providing an open cell polyurethane foam with a durable hydrophilic character comprising the steps of coating an addition polymer containing pendant anhydride groups of a carboxylic acid onto the cellular surface area of a polyurethane foam and reacting a portion of the pendant anhydride groups with ammonia or a low molecular weight primary or secondary monofunctional amine to impart the desired degree of hydrophilicity to the foam and reacting other of said groups with a polyfunctional amine cross-linking agent to provide permanence to said coating.

6. The process of claim 5 wherein the anhydride containing polymer is polyacrylic anhydride or copolymers of maleic anhydride with styrene, vinyl acetate, ethylene, propylene, butadiene, methyl vinyl ether or ethyl vinyl ether.

7. The process of claim 6 wherein the low molecular weight primary or secondary monofunctional amine is a dialkylamine, morpholine, β-hydroxyethylamine, mono-N-alkyldiethylene diamine, or N-dialkylethylene diamine.

8. A hydrophilic foam comprising an open cell polyurethane foam having as a coating on the cellular surface thereof an addition polymer containing pendant primary or secondary amide groups and adjacent pendant carboxylic acid or primary or secondary amide acid salt groups, said pendant and adjacent groups being present in an amount sufficient to render the foam hydrophilic.

9. The hydrophilic foam of claim 8 wherein the addition polymer is cross-linked by having a portion of said amide groups bridging between at least two molecules of said polymer.

References Cited

UNITED STATES PATENTS

| | | | |
|---|---|---|---|
| 2,313,565 | 3/1945 | McDowell et al. | 260—78 UA |
| 2,900,278 | 8/1959 | Powers et al. | 260—2.5 AD |
| 3,189,479 | 6/1965 | Coppick et al. | 117—98 |
| 3,382,090 | 5/1968 | Meisel et al. | 260—2.5 AD |

RALPH HUSACK, Primary Examiner

U.S. Cl. X.R.

117—62.1, 98, 138.8 D; 260—2.5 AD